Feb. 18, 1947.  H. T. KRAFT  2,416,183
AIRCRAFT LANDING GEAR
Filed June 3, 1942  3 Sheets-Sheet 1

INVENTOR
*Herman T. Kraft*
BY
*Evans & McCoy*
ATTORNEYS

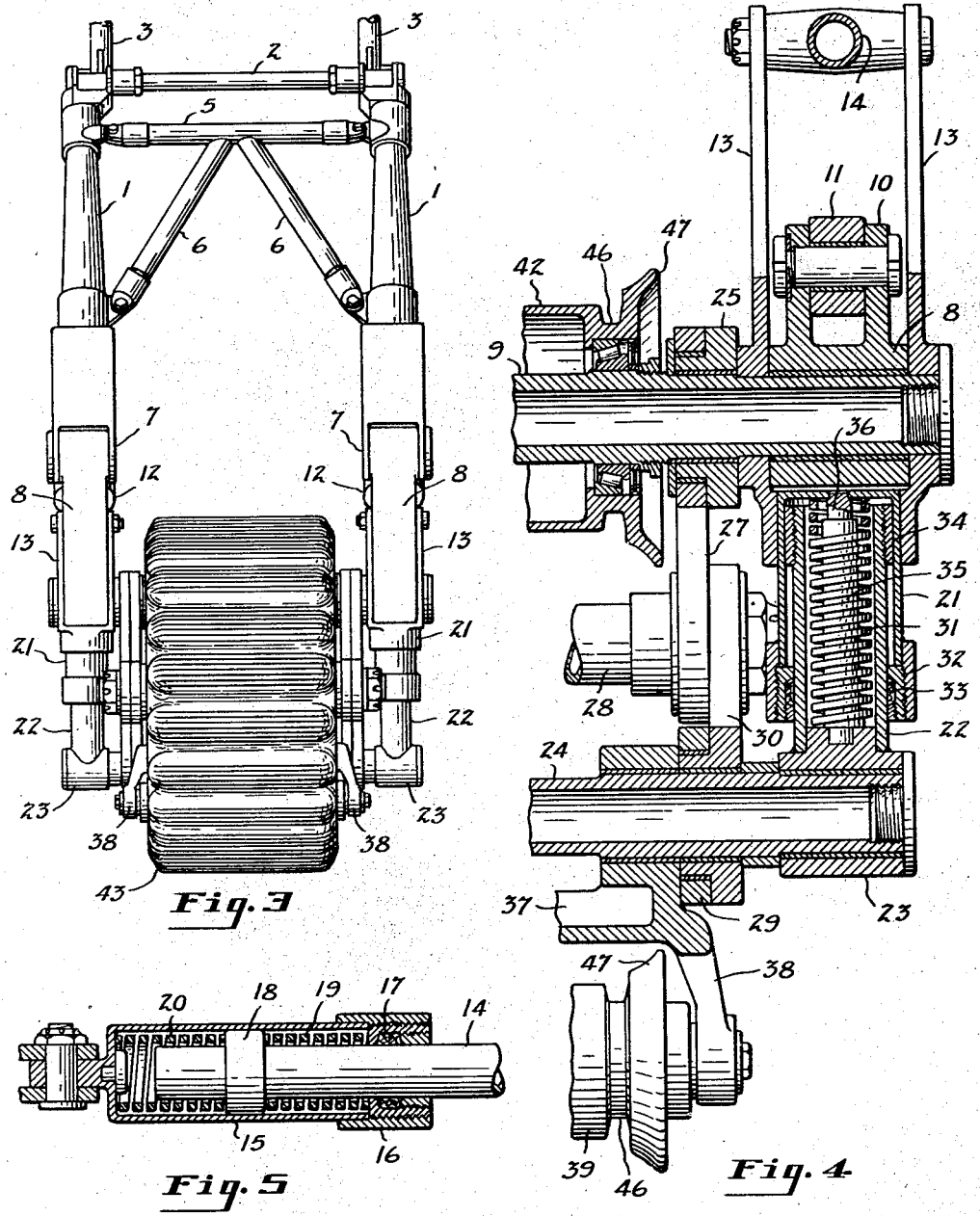

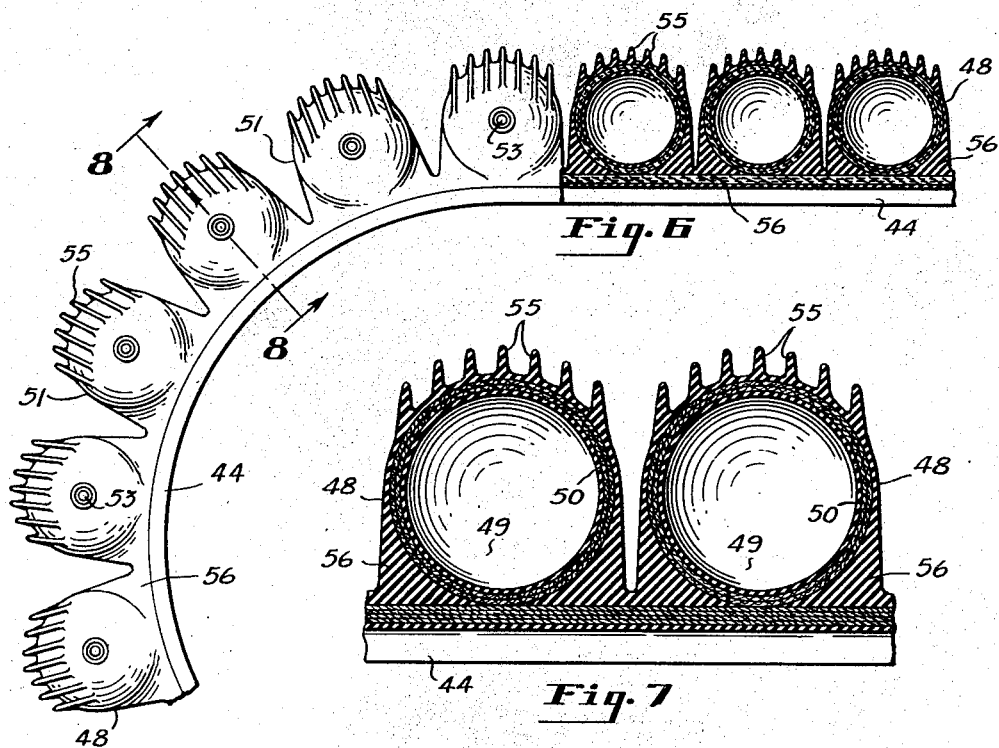
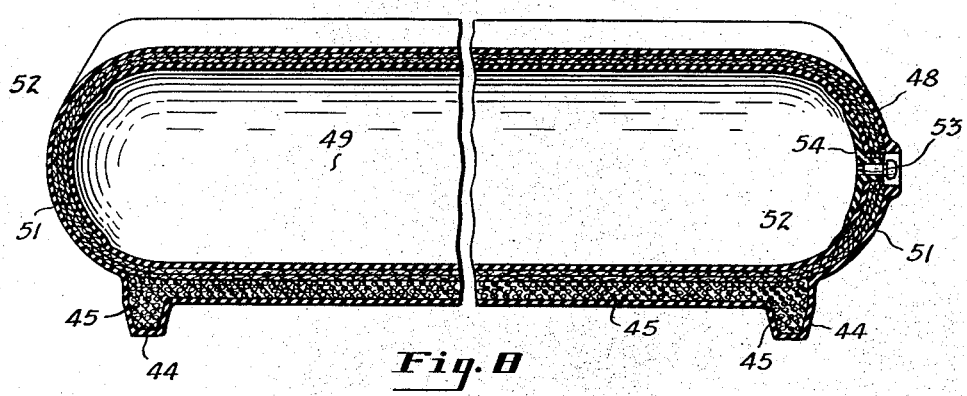

Patented Feb. 18, 1947

2,416,183

UNITED STATES PATENT OFFICE 2,416,183

AIRCRAFT LANDING GEAR

Herman T. Kraft, Akron, Ohio, assignor to The General Tire & Rubber Company, Akron, Ohio, a corporation of Ohio Application June 3, 1942, Serial No. 445,542

11 Claims. (Cl. 244—100)

This invention relates to aircraft landing gears and has for its object to provide a landing gear which will enable an aircraft to be landed without damage on soft ground.

A serious defect of aircraft landing gears heretofore used is that, in landing upon sand, plowed ground or other soft surfaces, the landing wheels commonly employed do not have sufficient supporting surface contacting the ground at the instant of impact and are likely to sink into the ground to a depth such that there is an excessive resistance to forward movement which may cause serious damage to the landing gear or to the aircraft, or both. A cure for the above mentioned defect is particularly desirable to enable military aircraft to be used more effectively.

The main objects of the present invention are to replace the wheels of an aircraft landing gear with a carriage provided with an endless tread which presents a large surface area to the ground, to so mount the endless tread that the tread runs freely on the wheels and may be quickly set in motion upon contact with the ground, and to so construct the tread that it serves as an effective impact cushioning element.

The principal objects more specifically stated are to provide an endless tread which is initially loose upon its supporting wheels but which is gradually tightened as the weight of the aircraft is imposed thereon; to provide a carriage of the endless tread type which is so mounted that it is capable of moving bodily with respect to the body of the aircraft and to provide resilient means for cushioning the bodily movement of the carriage for retaining the carriage in proper angular position with respect to the aircraft and for cushioning the rocking movements of the carriage; to provide an endless rubber tread with deep flexible ribs which are adapted to effectively cushion landing impacts; and to provide an endless rubber tread which is pneumatically cushioned by suitable means such as hollow transverse ribs which are inflatable to provide an air cushion for the tread.

With the above and other objects in view the invention may be said to comprise the landing gear illustrated in the accompanying drawings hereinafter described and particularly set forth in the appended claims together with such variations and modifications thereof as will be apparent to those skilled in the art to which the invention pertains. Reference should be had to the accompanying drawings forming a part of this specification in which:

Fig. 3 is a front elevation of the landing gear.

Fig. 4 is a section taken on the line indicated at 4—4 in Fig. 2.

Fig. 5 is a section taken on the line indicated at 5—5 in Fig. 2.

Fig. 6 is a fragmentary side elevation of the endless rubber tread.

Fig. 7 is a fragmentary longitudinal section transversely through two of the hollow inflatable cross ribs; and Fig. 8 is a section taken on the line indicated at 8—8 in Fig. 6.

Figure 1:
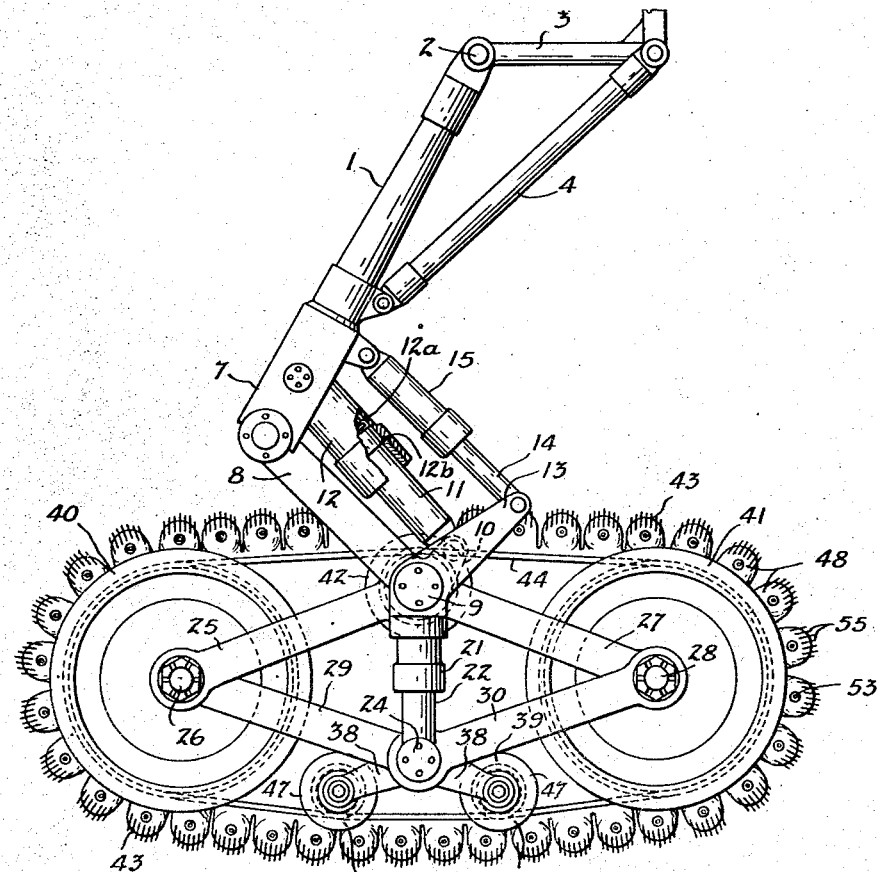
Figure 1 is a side elevation of a landing gear embodying the invention showing the endless tread carriage in the position which it normally occupies when the supporting strut is extended.

The landing gear of the present invention, which may be of the retractable type, is carried by struts 1 which are pivoted at their upper ends to a transverse shaft 2 mounted in supporting members 3 which are suitably connected to the framework of the aircraft. Rearwardly extending braces 4 are pivoted at their upper ends to the supporting members 3 rearwardly of the shaft 2 and at their lower ends to the struts 1. As shown in Fig. 3, the two struts 1 are held in proper spaced relation by a cross bar 5 suitably connected at its ends to the struts 1 adjacent their upper ends and by diagonal braces 6 connected at their upper ends to the member 5 and at their lower ends to the struts 1.

The struts 1 have forked lower ends 7 in which are pivoted trailing links 8 which connect the lower ends of the struts 1 to a carriage supporting shaft 9 which is journalled at its ends in the rear ends of the links 8. The links 8 correspond to the wheel supporting links and the shaft 9 corresponds to the wheel axle of a conventional landing gear. As in the case of a conventional landing gear resilient means is provided for yieldably resisting upward swinging movements of the links 8. The links 8 have upwardly projecting arms 10 at their rear ends which provide a connection for a resilient cushioning means such as commonly used in landing gears. Such cushioning means may be in the form of telescopic braces, each comprising a plunger 11 pivoted to one of the arms 10 and a cylinder 12 which receives the plunger 11 and which is pivoted to the strut 1 above the lower end thereof. The cylinder 12 may be provided with a spring 12a which resists inward movement of the plunger 11 and thereby offers resistance to upward movement of the link 8 and with a shoulder 12b which limits the outward movement of the plunger 11.

Carriage frame members 13 are mounted upon opposite ends of the shaft 9. These frame members each have a portion extending upwardly from the shaft and these upwardly extending portions are adapted to be connected to the struts 1 above the links 8 by a second pair of links parallel to the links 8. These upper links are preferably telescopic links each consisting of a rod 14 pivoted to the arm 13 and a cylinder 15 pivoted to the strut 1. Each cylinder 15 is provided with a head 16 which has a packing 17 within which the rod 14 has a close fit. Each rod 14 carries a piston 18 within the cylinder 15 and the piston 18 is engaged by springs 19 and 20, the spring 19 being disposed between the piston 18 and the inner end of the cylinder 15. The springs 19 and 20 normally hold the telescopic links to a length substantially the same as that of the links 8 so that the parallel links hold frame members 13 against angular movement with respect to the struts 1 during vertical movements of the carriage. Movement of the rod 14 in either direction with respect to the cylinder 15 is resisted by the springs 19 and 20 which serve to cushion rocking movements of the carriage.

Figure 2:
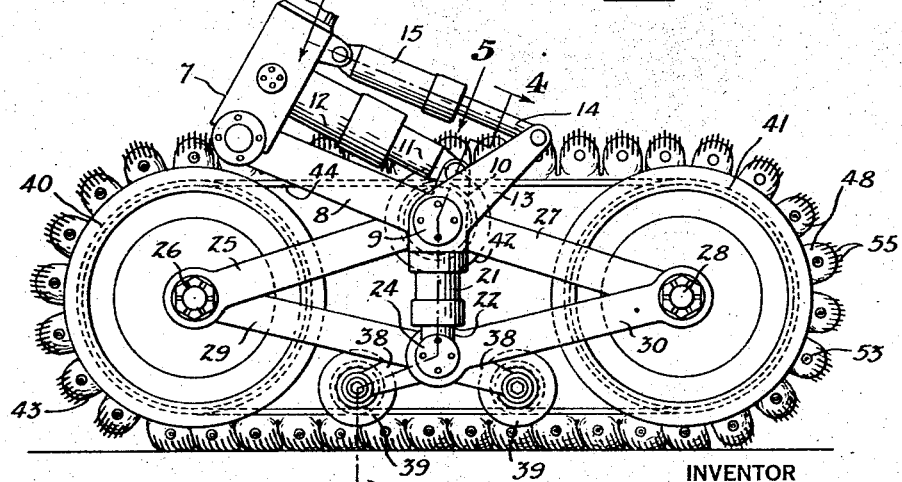
Fig. 2 is a side elevation similar to Fig. 1 showing the landing gear with the endless tread carriage in the position which it assumes when the weight of the aircraft is imposed thereon.

The springs of the telescopic braces formed by the plunger 11 and cylinders 12 yieldingly resist movement of the carriage bodily from the position shown in Fig. 1 to the position shown in Fig. 2 while the resilient telescopic links comprising the rods 14 and cylinders 15 yieldingly resist rocking movements of the carriage with respect to the struts. The frame members 13 each have a tubular downward extension 21 which receive rods 22 which are connected at their lower ends to collars 23 which receive opposite ends of a transverse shaft 24. The shafts 9 and 24 serve as pivots for toggles through which certain of the carriage supporting wheels are extended or retracted. The upper toggle comprises links 25 connecting the opposite ends of shaft 9 with the opposite ends of a forward axle 26 and links 27 connecting the ends of the shaft 9 to the ends of a rear axle 28. The lower toggle comprises links 29 connecting the ends of the shaft 24 to the ends of the front axle 26 and links 30 connecting the ends of the shaft 24 with the ends of the rear axle 28. Resilient means is provided to resist the collapsing movement of the upper and lower toggles, and this means, as best shown in Fig. 4, comprises a spring 31 mounted within the tubular frame member 21. The lower end of the tubular member 21 is provided with a head 32 in which the rod 22 has a close fit, suitable packing 33 being provided to restrict leakage of air. The upper end of the rod 22 has a sleeve 34 attached thereto which has a sliding fit within the tubular member 21, sleeve 34 serving as a piston and also as a stop member engageable with the head 32 to limit the downward movement of the rod 22 and to thereby limit the spreading of the two toggles. The rod 22 is preferably tubular and the collar 23 has a post 35 attached thereto which is received within the coil spring 31 and which is engageable with an abutment 36 carried by the upper closed end of the cylinder to limit the upward movement of the rod 22 and the collapsing movement of the two toggles. The lower toggle shaft 24 carries a bogie frame 37 which has forwardly and rearwardly extending arms 38 adjacent its opposite ends between which front and rear bogie wheels 39 are mounted. The front and rear axles 26 and 28 carry front and rear main supporting wheels 40 and 41 and the upper supporting shaft 9 has a wheel 42 mounted thereon. The front and rear wheels 40 and 41, the bogie wheels 39 and the upper wheel 42 serve to support an endless ground-engaging tread 43.

The landing carriage consisting of the endless tread 43, the tread supporting wheels 39, 40, 41 and 42, the upper and lower toggle links 25, 27, 29 and 30, and the toggle pivot shafts 9 and 24, is normally suspended from the struts 1 substantially in the position shown in Fig. 1 of the drawings. The springs 19 and 20 in the cylinder 15 are so proportioned that the endless tread carriage is supported so that the forward end of the bottom run of the tread is somewhat above the lowermost portion of the bottom run so that the area of engagement of the bottom run of the tread with the ground will be gradually increased as the weight of the aircraft is imposed upon the carriage. As the tread 43 comes into engagement with the ground a gradually increasing pressure will be applied to the bogie wheels 39, and this pressure causes the toggle pivot shaft 24 to move upwardly against the action of the cushioning spring 31 and the air pressure within the cylinder 21. The spring 31 normally holds the toggle pivots a distance apart such that the bogie wheels 39 bow the lower run of the endless tread 43 downwardly so that the bottom run has a central rounded portion which initially contacts with the ground surface. As the pressure on the bottom run of the tread increases, the toggle pivot 24 is moved upwardly, increasing the angle between the links 29 and 30 and also the links 25 and 27, causing the axles 27 and 28 to be spread apart and moving the wheels 40 and 41 outwardly to take up slack in the belt 43. The belt 43, when the supporting wheels are in the position shown in Fig. 1, is loose upon the supporting wheels so that the tread may move freely or even slip with respect to the wheels. As the larger supporting wheels 40 and 41 are spread apart tension is applied to the endless tread so that as the bottom run of the tread is straightened out into full ground engagement the tread will be tensioned on the supporting wheels.

In addition to the resilient cushioning supports for the carriage which cushion the vertical and rocking movements of the carriage with respect to the strut, it is very desirable that the ground engaging tread itself be constructed to provide an effective impact cushion. As best shown in Figs. 6, 7 and 8, the endless tread, which is preferably formed of rubber, is provided with internal ribs 44 along its side edges and these ribs as well as the body portion of the tread are reinforced with longitudinal cords 45 which may be conventional tire cords such as used for reinforcing the carcass of a pneumatic tire. The flexible endless tread is retained upon the supporting wheels by means of the ribs 44 which engage grooves 46 in the supporting wheels and also by side flanges 47 at the ends of the supporting wheels which overlie side edge portions of the tread. To provide effective cushioning means the tread 43 is provided with regularly spaced hollow transverse ribs 48 each provided with a substantially cylindrical cavity 49 which is adapted to receive air under pressure. The hollow ribs provide a series of inflatable cushions distributed throughout the exterior surface of the tread. Each of the ribs 48 has fabric reinforcement in the form of superposed bands 50 extending around the cylindrical cavity 49. The ends of the cavities 49 are reinforced by end portions 51 of the bands 50 which are slit and folded into overlapping relation. In forming the tread the bands 50 may be wrapped about a cylindrical air bag 52 of uncured or partially cured rubber and provided at one end with a valve stem 53 anchored to a reinforcement 54 at one end of the bag. After the end portions 51 of the bands are folded over the ends of the bag, the fabric covered bags may be placed upon the previously formed endless belt and the covering strips of rubber may then be applied. While the bands 50 are being applied to the air bag 52, the air bags will contain just enough air to hold them to shape. After the external layer of rubber has been applied, the entire endless tread may be placed in a suitable mold and sufficient pressure applied to the inflatable ribs to expand the covering rubber into the mold cavities. By reason of the cord reinforcement and the relatively small diameter of the cavities 49, these cavities may be inflated with air under considerable pressure so as to provide an effective air cushion for the endless tread. The exterior surfaces of the ribs 48 are provided with spaced flexible ground engaging fins 55 which extend longitudinally of the ribs. The ribs 48 are separated by deep, relatively narrow grooves so that the walls of adjacent cavities 49 are brought into engagement side by side as the side walls of the ribs are bulged by the weight of the aircraft imposed upon the tread. The ribs 48 also may have a considerable lateral movement due to the drag of the ground surface which serves to cushion the impact in the direction of the ground surface and to assist in overcoming the inertia of the tread upon initial engagement with the ground. The walls of the air cavities 49 have relatively thick base portions 56 which are integrally joined to the body portion of the endless tread and which firmly secure the more flexible outer portions of the rib to the body of the tread.

The large area of contact between the endless tread 43 and the ground greatly lessens the pressure per unit of area so that the endless tread is capable of running upon a ground surface into which a landing wheel would sink. The resilient mounting of the endless tread carriage for vertical and rocking movements and the initial looseness of the tread greatly lessen the shocks of impact and the deep pneumatic cushions on the tread surface greatly adds to the cushioning effect and assists in overcoming the inertia of the tread as the tread is initially moved by contact with the ground surface.

To the accomplishment of the foregoing and related ends, said invention, then, consists of the means hereinafter fully described and particularly pointed out in the claims, the following description setting forth in detail certain means and one mode of carrying out the invention, such disclosed means and mode illustrating, however, but one of the various ways by which the principle of the invention may be used.

What I claim is:

1. An aircraft landing gear comprising a carriage having front and rear axles, upwardly and downwardly bent toggles connecting and supporting said axles, wheels carried by said axles, an endless flexible tread running over said wheels, wheels carried by the toggle pivots and engaging the upper and lower runs of said endless tread, resilient means interposed between the upper and lower toggle pivots and acting to spread said pivots and retract said axles, a supporting strut attached to the aircraft, means for connecting said carriage to said strut for bodily movement in a vertical direction, cushioning means interposed between the carriage and strut, and means for yieldably holding said carriage against rocking movements with respect to said strut.

2. An aircraft landing gear comprising a carriage having front and rear wheels and an endless tread running over said wheels, upwardly and downwardly bent upper and lower toggles interposed between said wheels for spreading and retracting the same, a bogie frame rockably mounted upon the lower toggle and having front and rear tread engaging wheels, suspension means flexibly connecting the upper toggle to the aircraft, and cushioning means interposed between said carriage and the aircraft.

3. An aircraft landing gear comprising a carriage having front and rear wheels and an endless tread running over said wheels, upwardly and downwardly bent upper and lower toggles interposed between said wheels for spreading and retracting the same, a bogie frame rockably mounted upon the lower toggle and having front and rear tread engaging wheels, members suspending said carriage from the aircraft so connected to said upper toggle as to permit the carriage to rock about a transverse axis or to move vertically with respect to the aircraft, and means for cushioning said vertical and rocking movements.

4. An aircraft landing gear comprising a carriage having front and rear wheels and an endless tread running over said wheels, upwardly and downwardly bent upper and lower toggles interposed between said wheels for spreading and retracting the same, a bogie frame rockably mounted upon the lower toggle and having front and rear tread engaging wheels, a strut attached to the aircraft, links connecting said strut to said upper toggle for pivotally suspending said carriage, and means for cushioning movements of the carriage relative to said strut.

5. An aircraft landing gear comprising a carriage having front and rear wheels and an endless tread running over said wheels, upwardly and downwardly bent upper and lower toggles interposed between said wheels for spreading and retracting the same, a bogie frame rockably mounted upon the lower toggle and having front and rear tread engaging wheels, yielding pressure applying means exerting an upward thrust on the upper toggle and a downward thrust on the lower toggle to press said bogie wheels against said belt, a supporting member attached to the aircraft, means for movably suspending said carriage from said supporting member, and cushioning means interposed between said upper toggle and said supporting member.

6. An aircraft landing gear comprising a carriage having front and rear wheels and an endless tread running over said wheels, upwardly and downwardly bent upper and lower toggles interposed between said wheels for spreading and retracting the same, a bogie frame rockably mounted upon the lower toggle and having front and rear tread engaging wheels, a strut attached to the aircraft, links connecting said strut to said upper toggle for pivotally suspending said carriage, and yielding pressure applying means exerting an upward thrust on the upper toggle and a downward thrust on the lower toggle to retract the front and rear wheels and move the bogie wheels toward the tread.

7. An aircraft landing gear comprising a carriage having front and rear axles, each having a wheel thereon, an endless tread running over said wheels, upwardly and downwardly bent upper and lower toggles, each comprising links connected to the ends of said axles and a cross shaft pivotally connecting the toggle links, a bogie frame rockably mounted upon the pivot shaft of the lower toggle and having wheels forwardly and rearwardly of the toggle pivot smaller than said front and rear wheels and bearing upon the interior of the tread, springs acting upon said toggles to spread the pivots thereof apart to retract the front and rear wheels and extend said bogie wheels, a supporting strut attached to the aircraft, suspension elements connecting said strut to said upper toggle to suspend the carriage for rocking and vertical bodily movements with respect to said strut, and means for cushioning said movements of the carriage.

8. An aircraft landing gear comprising a carriage having front and rear axles, each having a wheel thereon, an endless tread running over said wheels, upwardly and downwardly bent upper and lower toggles, each comprising links connected to the ends of said axles and a cross shaft pivotally connecting the toggle links, a bogie frame rockably mounted upon the pivot shaft of the lower toggle and having wheels forwardly and rearwardly of the toggle pivot smaller than said front and rear wheels and bearing upon the interior of the tread, springs acting upon said toggles to spread the pivots thereof apart to retract the front and rear wheels and extend said bogie wheels, a supporting strut attached to the aircraft, a link pivoted to the strut and to the upper toggle, means for yieldably resisting upwardly swinging movements of said link, and means for yieldably resisting rocking movements of the carriage with respect to said link.

9. An aircraft landing gear comprising a carriage having front and rear axles, each having a wheel thereon, an endless tread running over said wheels, upwardly and downwardly bent upper and lower toggles, each comprising links connected to the ends of said axles and a cross shaft pivotally connecting the toggle links, a bogie frame rockably mounted upon the pivot shaft of the lower toggle and having wheels forwardly and rearwardly of the toggle pivot smaller than said front and rear wheels and bearing upon the interior of the tread, springs acting upon said toggles spread the pivots thereof apart to retract the front and rear wheels and extend said bogie wheels, a supporting strut attached to the aircraft, a trailing link connecting said strut to the pivot shaft of the upper toggle, means for yieldably resisting upward movements of said link, and means connecting said strut to said carriage for yieldably resisting rocking movements of said carriage about the upper toggle pivot shaft.

10. An aircraft landing gear comprising a carriage having front and rear wheels and an endless tread running over said wheels, upwardly and downwardly bent upper and lower toggles interposed between said wheels, a bogie wheel mounted on the upper toggle pivot and engageable with the under side of the upper run of the tread, a bogie frame rockably mounted on the lower toggle pivot and having front and rear wheels engaging the bottom run of the tread, the bogie wheels and toggles being so disposed that extension of the front and rear wheels applies tension to the tread, a spring interposed between the toggles and acting to spread the same and to press the bottom run of the tread downwardly intermediate the front and rear wheels, suspension means connecting the upper toggle with the aircraft and cushioning means interposed between the carriage and aircraft.

11. An aircraft landing gear comprising a carriage having front and rear wheels and an endless tread running over said wheels, upwardly and downwardly bent upper and lower toggles interposed between said wheels, a bogie wheel mounted on the upper toggle pivot and engageable with the under side of the upper run of the tread, a bogie frame rockably mounted on the lower toggle pivot and having front and rear wheels engaging the bottom run of the tread, the bogie wheels and toggles being so disposed that extension of the front and rear wheels applies tension to the tread, a spring interposed between the toggles and acting to spread the same and to press the bottom run of the tread downwardly intermediate the front and rear wheels, a supporting strut attached to the aircraft, a trailing link connecting said strut to the upper toggle pivot, cushioning means yieldably resisting upward swinging movements of said link, and means for yieldably resisting rocking movements of said carriage about the upper toggle pivot.

HERMAN T. KRAFT.

REFERENCES CITED

The following references are of record in the file of this patent:

UNITED STATES PATENTS

| Number | Name | Date |
| --- | --- | --- |
| 2,093,456 | Knox | Sept. 21, 1937 |
| 1,400,100 | Reddaway | Dec. 13, 1921 |
| 2,254,787 | Aukland | Sept. 2, 1941 |
| 2,281,351 | Dowty | Apr. 28, 1942 |

FOREIGN PATENTS

| Number | Country | Date |
| --- | --- | --- |
| 252,769 | Britain | June 2, 1926 |
| 760,547 | France | Dec. 14, 1933 |
| 542,817 | Britain | Jan. 28, 1942 |
| 537,541 | Britain | June 26, 1941 |